UNITED STATES PATENT OFFICE.

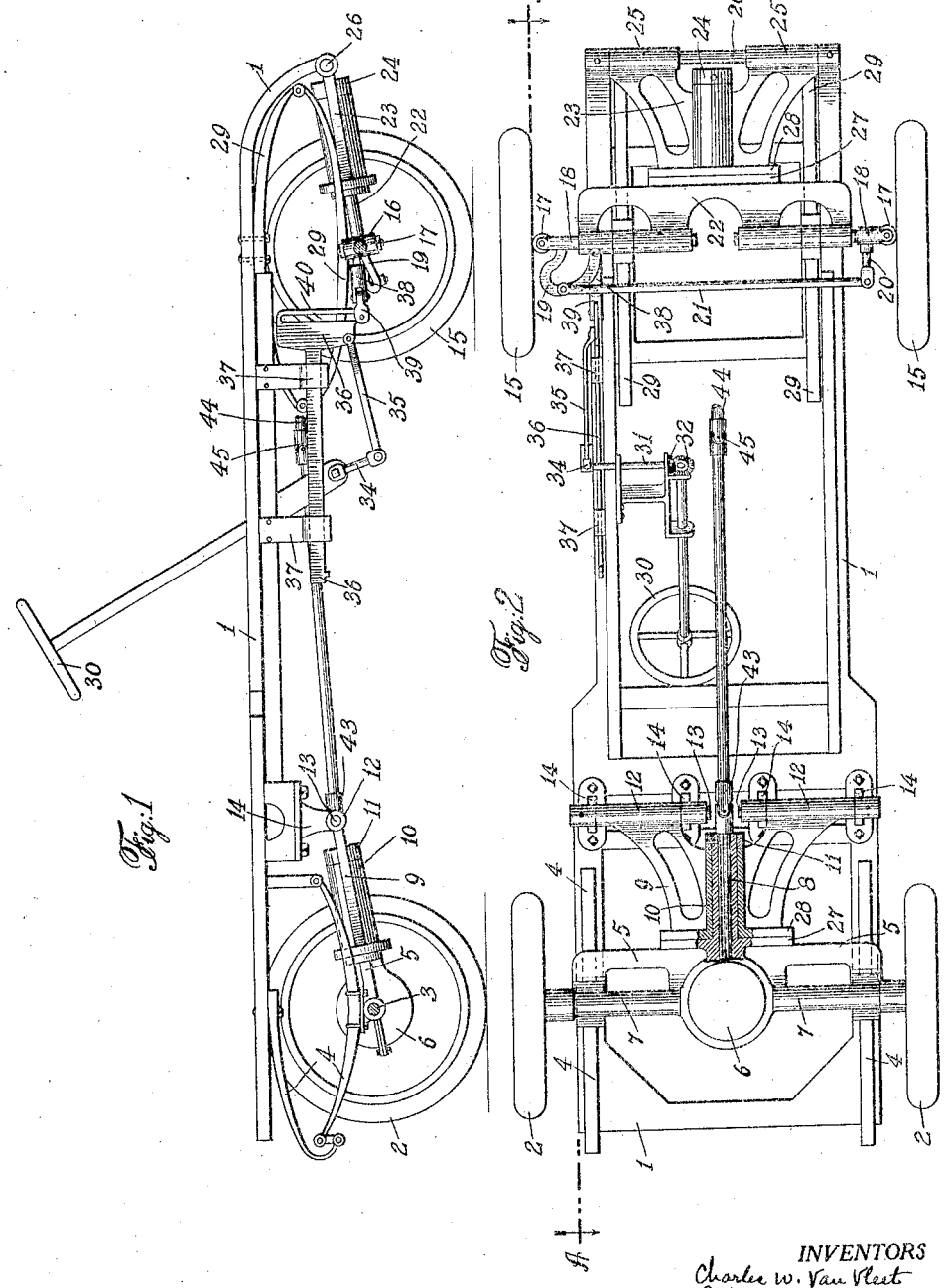

CHARLES WALLACE VAN VLEET AND ROBERT EARL HALEY, OF SAUGERTIES, NEW YORK, ASSIGNORS OF ONE-THIRD TO JAMES T. MAXWELL, OF SAUGERTIES, NEW YORK.

CHASSIS.

1,345,421.     Specification of Letters Patent.     Patented July 6, 1920.

Application filed November 20, 1915, Serial No. 62,450. Renewed April 26, 1920. Serial No. 376,832.

*To all whom it may concern:*

Be it known that we, CHARLES W. VAN VLEET and ROBERT E. HALEY, citizens of the United States, and residents of Saugerties, county of Ulster, State of New York, have invented certain new and useful Improvements in Chassis, of which the following is a specification.

The invention relates to improvements in chassis and is of particular advantage for use in automobile chassis. One object of the invention is to provide an arrangement in which the body or supporting frame is cushioned with respect to the wheel axles, or the like, permitting free action of the springs or cushioning means, providing for the efficient operation of the steering mechanism in a manner such that it will not bind, and the rocking of the body or supporting frame on the cushioning means does not affect the steering mechanism. In its preferred form the invention also comprehends an arrangement in which the springs or cushioning means are relieved from all lateral, as well as endwise, strains while permitting the free action of the cushioning means.

Further more specific features and advantages will more clearly appear from the following description taken in connection with the accompanying sheet of drawings which form a part of this specification. In the drawings—

Figure 1 is a side view of a chassis of an automobile embodying our invention in one form, taken on the line A—A of Fig. 2, the engine and other parts being omitted to more clearly illustrate the improvements; and Fig. 2 is a plan view of the same looking up from beneath the chassis.

In the drawings 1 represents a supporting frame for supporting the body of the vehicle in any suitable manner. 2, 2 represent the rear wheels and 3 one section of the rear axle. Cushioning springs 4 are located between the axle 3 and frame 1. Pivoted about the rear axle is a member 5 having journal bearings 7, 7 at each end of the axle on either side of the differential casing 6. The member 5 is accordingly pivoted about an axis parallel and coincident with that of the rear axle. The member 5 is provided with a sleeve 8 extending at right angles to this axis about which sleeve is pivoted a second member 9 having its journal bearing thereon at 10. A head ring 11 is pinned, or otherwise secured, to the end of the sleeve 8 in order to hold the member 9 thereon and prevent it from moving relatively to the member along the axis about which it is pivoted thereon, while permitting it to rotate or oscillate laterally with respect thereto about said axis. The member 9 is pivoted to the frame 1 by means of journals 12 surrounding pins 13 carried by downwardly projecting ears 14 on the frame 1. The member 9 is thus pivoted to the frame 1 about an axis parallel to the rear axle. By this arrangement it will be seen that while the frame 1 and the body to be carried thereby has free vertical movement with respect to the axle and also free rocking or lateral oscillating movement with respect thereto, yet it is rigidly prevented from having any longitudinal movement with respect thereto or any lateral movement with respect thereto parallel with the axle.

The front steering wheels are shown at 15 provided with the usual stub axles 16 carried by members 17 pivoted about a substantially vertical axis on transverse members 18. A hook-shaped member 19 is rigidly secured to one of the members 17 and an arm 20 is rigidly secured to the other member 17, the member 19 and arm 20 being linked together by a link 21 so that upon turning one wheel about the vertical axis of its member 17 the other front wheel 15 will turn correspondingly in a well-known manner.

Pivotally mounted upon the members 18 is a member 22 similar to the member 5 having a similar sleeve extending at right angles to members 18 and upon which sleeve is journaled a member 23 similar to the member 9, the member 23 being held on the sleeve by a head 24. The member 23 is thus pivoted about an axis at right angles to the axis about which the member 22 is pivoted with respect to front wheel axles. The member 23 is also pivoted to the frame 1 by means of journals 25 encircling a pin 26 carried on the end of the frame 1. The members 5 and 22 are provided with extensions 27 the faces of which bear against the faces of corresponding extensions 28 on members 9 and 23, respectively, all of said members being well braced. Cushioning springs 29 are located between the front axle members 18 and frame 1 to form a suitable cushion in the front of the vehicle.

A steering wheel is indicated at 30 adapted to oscillate a rod 31 by means of gears 32. The rod 31 has connected to it a crank arm 34 to the lower end of which is attached one end of a link 35, the other end of the link 35 being connected to a member 36 adapted to slide longitudinally in ears 37 depending from the frame 1. Pivotally connected to the inner end of the hook-shaped member 19 is a member 38 to which is pivoted a short link 39 having a forked end in which is located a roller pin extending through a vertical slot 40 in the sliding member 36. Thus, when the steering wheel is turned, the member 36 is moved longitudinally, which, in turn, causes a similar movement of member 38 through the link 39 and thus causes an oscillation of the members 17 carrying the stub axles so that the front wheels may be steered. As the frame 1 moves up and down with respect to the wheels and axles the pin-and-slot connection between the members 36 and 38 permits one to move vertically with respect to the other without, in any way, affecting the steering mechanism or causing it to gain. With a suspension which permits such free vertical movement of the frame 1 with respect to the axles while preventing all lateral and longitudinal movement of the frame with respect to the axles, as above described, this is particularly important and advantageous.

Located concentrically within the sleeve 8 is a driving shaft which is connected with another driving shaft by a universal joint 43 located in the axis of which the member 9 is pivoted to the frame, the latter driving shaft being in turn connected to another shaft 44 by a universal joint 45, the shaft 44 being connected to any suitable source of power in any suitable manner.

While the improvements have been described in great detail with respect to one embodiment of the invention, it will be understood that the invention is not limited to such details, as many changes and modifications may well be made and many other adaptations of the invention employed.

What is claimed as new and desired to be secured by Letters Patent is:

1. A chassis having in combination with a supporting frame wheels and axles, a member pivoted with respect to each of said axles on an axis parallel thereto, a second member pivoted with respect to said first member about an axis at right angles to said first axis, said second member being also pivoted to said frame on an axis parallel to the first axis, whereby said frame is prevented from moving longitudinally and laterally with respect to the axle but permitted to rock laterally about said second axis and steering mechanism having a member carried by the frame and a member carried with the steering axle, said last two members being connected by means permitting one to move vertically with respect to the other without causing movement of the steering axle whereby the lateral rocking of said frame does not affect the steering.

2. A chassis having in combination with a supporting frame, wheels and axles, a member pivoted with respect to each of said axles on an axis parallel thereto, a second member pivoted with respect to said first member about an axis at right angles to said first axis, said second member being also pivoted to said frame on an axis parallel to the first axis, whereby said frame is prevented from moving longitudinally and laterally with respect to the axle but permitted to rock laterally about said second axis and steering mechanism, comprising a member having longitudinal movement connected with the steering axle for rotating the steering axle and another member having a longitudinal movement for operating said last-mentioned member, said last two members having a pin-and-slot connection permitting one to move vertically with respect to the other, whereby the lateral rocking of said frame does not affect the steering.

3. A chassis having in combination with a supporting frame, wheels and axles, a member pivoted with respect to each of said axles on an axis parallel thereto, a second member pivoted with respect to said first member about an axis at right angles to said first axis, said second member being also pivoted to said frame on an axis parallel to the first axis, whereby said frame is prevented from moving longitudinally and laterally with respect to the axle but permitted to rock laterally about said second axis and steering mechanism comprising a member having longitudinal movement and connected with the steering axle by a universal joint for rotating the steering axle about a vertical axis and another member having a longitudinal sliding movement on the frame for operating said last-mentioned member, said last-mentioned member being connected by means permitting one of said members to move vertically with respect to the other without causing movement of the steering axle, whereby the lateral rocking of said frame does not affect the steering.

4. A chassis having in combination with a supporting frame, wheels and axles, a member pivoted with respect to each of said axles on an axis parallel thereto, a second member pivoted with respect to said first member about an axis at right angles to said first axis, said second member being also pivoted to said frame on an axis parallel to the first axis, whereby said frame is prevented from moving longitudinally and laterally with respect to the axle but permitted to rock laterally about said second axis and steering mechanism comprising a member having longitudinal movement and connected with the steering axle by a universal joint for rotating the steering axle about a vertical axis and another member having a longitudinal sliding movement on the frame for operating said last-mentioned member, said last-mentioned member being connected by a pin-and-slot connection permitting one to move vertically with respect to the other whereby the lateral rocking of said frame does not affect the steering and means for imparting longitudinal movement to said sliding member.

5. A chassis having in combination a supporting frame, front and rear axles, a member pivoted with respect to each of said axles on an axis parallel thereto, a second member pivoted with respect to said first member about an axis at right angles to said first axis, said second member being also pivoted to said frame on an axis parallel to the rear axle and means preventing movement of said members with respect to one another along said second axis, a driving shaft for the rear axle concentric with said second axis and steering mechanism having a member carried by the frame and a member carried with the steering axle, said last two members being connected by means permitting one to move vertically with respect to the other without causing movement of the steering axle whereby the lateral rocking of said frame does not affect the steering.

6. A chassis having in combination a supporting frame, front and rear axles, a member pivoted with respect to each of said axles on an axis parellel thereto, a second member pivoted with respect to said first member about an axis at right angles to said first axis, said second member being also pivoted to said frame on an axis parallel to the rear axle and means preventing movement of said members with respect to one another along said second axis, a driving shaft for the rear axle concentric with said second axis and steering mechanism comprising a member having longitudinal movement and connected with the steering axle by a universal joint for rotating the steering axle about a vertical axis and another member having a longitudinal sliding movement on the frame for operating said last-mentioned member, said last-mentioned member being connected by means permitting one of said members to move vertically with respect to the other without causing movement of the steering axle whereby the lateral rocking of said frame does not affect the steering.

7. A chassis having in combination a supporting frame, front and rear axles and cushioning means between said frame and axles, each axle being connected to the frame by means of a member pivoted with respect to the axle about an axis parallel thereto and a second member pivoted with respect to the first member about an axis at right angles to the first axis, said second member being also pivoted with respect to the frame about an axis parallel with the axle and means preventing movement of said members with respect to one another along said second axis, a driving shaft passing through said second member on the rear axle and steering mechanism having a member carried by the frame and a member carried with the steering axle, said last two members being connected by means permitting one to move vertically with respect to the other without causing movement of the steering axle whereby the lateral rocking of said frame does not affect the steering.

8. A chassis having in combination a supporting frame, front and rear axles and cushioning means between said frame and axles, each axle being connected to the frame by means of a member pivoted with respect to the axle about an axis parallel thereto and a second member pivoted with respect to the first member about an axis at right angles to the first axis, said second member being also pivoted with respect to the frame about an axis parallel with the axle and means preventing movement of said members with respect to one another along said second axis, a driving shaft passing through said second member on the rear axle and steering mechanism comprising a member having longitudinal movement and connected with the steering axle by a universal joint for rotating the steering axle about a vertical axis and another member having a longitudinal sliding movement on the frame for operating said last-mentioned member, said last-mentioned member being connected by a pin-and-slot connection permitting one to move vertically with respect to the other whereby the lateral rocking of said frame does not affect the steering and means for imparting longitudinal movement to said sliding member.

9. A chassis having in combination a supporting frame, wheels and axles therefor, cushioning means between the axles and frame, whereby the frame is permitted to rock with respect to the axles and steering mechanism comprising a member having longitudinal movement and connected with the steering axle by a universal joint for rotating the steering axle about a vertical axis and another member having a longitudinal sliding movement on the frame for operating said last-mentioned member, said last-mentioned member being connected by a pin-and-slot connection permitting one to move vertically with respect to the other whereby the lateral rocking of said frame does not affect the steering and means for imparting longitudinal movement to said sliding member.

In testimony whereof we have signed our names to this specification.

CHARLES WALLACE VAN VLEET.
ROBERT EARL HALEY.